Patented Sept. 6, 1938

2,129,626

UNITED STATES PATENT OFFICE 2,129,626

PNEUMATIC TIRE

Theodore A. Riehl, Akron, Ohio, assignor to Wingfoot Corporation, Wilmington, Del., a corporation of Delaware No Drawing. Application March 31, 1937, Serial No. 134,099

3 Claims. (Cl. 91—68)

This invention relates to an improved method of manufacturing pneumatic tires with artificial silk. With such tires some adhesive should be employed to bond the artificial silk to the rubber. More particularly this invention relates to the treatment of the artificial silk fabric with an emulsion before applying the adhesive to prevent excessive impregnation of the fabric by the adhesive and to improve adhesion. The treatment may be applied to the artificial silk threads but is preferably applied to the cords or fabric made therefrom.

The adhesive employed is of the latex-casein type. The casein is present as a soluble salt, preferably sodium caseinate. No definite formula is required as the composition of the adhesive may be varied somewhat, as by the use of more or less latex or casein or by the addition of various ingredients. Gelatin and other proteins may be used, altho casein will generally be preferred. The emulsion comprises water and a low-boiling volatile oil such as benzene or gasoline. A stabilized emulsion is preferred. Results obtained with emulsions when compared with the use of water or a volatile oil alone show that the emulsion is superior. Higher adhesion values are possible and a more flexible cord or fabric is obtained. Furthermore the emulsion dries more rapidly than water alone. With the preferred type of emulsion it has been found possible to reduce the amount of casein employed without weakening the adhesion obtained. All of these are desirable features which the invention makes possible.

The preferred emulsion comprises water and gasoline, ammonium oleate as an emulsifier and gelatin as a reinforcing agent. For example, the emulsion may comprise 20 parts of distilled water, 10 parts of gasoline, .40 part of ammonium oleate and .04 part gelatin. The fabric is treated with this emulsion and while still wet is then treated with the casein-latex adhesive which may comprise 2 or 3% of sodium caseinate to 16% of rubber in water. Excess emulsion is advantageously removed by an air jet before applying the adhesive and excessive adhesive is advantageously removed in a similar way. The treated cord or fabric is then dried. It may, for example, be dried for a few minutes, for example 15 minutes, at a temperature in the neighborhood of 130° or higher and then subsequently dried for 30 minutes at 250° F. This fabric is then built into the tire in the usual way with unvulcanized rubber adjacent the treated artificial silk. This is then subjected to vulcanization as usual.

Instead of employing gasoline in the emulsion, benzene has been used. Other soaps than ammonium oleate may be employed although this soap was found quite satisfactory. Instead of stabilizing with soap and gelatine it was found that a small amount of a condensation derivative of rubber prepared according to Sebrell 2,052,423 (for example "Pliolite" manufactured by The Goodyear Tire & Rubber Company) gave good results. Water in ethyl acetate with nitrocellulose as a stabilizer was also tried but was not found to be quite as satisfactory. With water and benzene, saponin was found suitable as a stabilizer, altho the emulsion was not quite as stable as that above referred to in the preferred example. Any suitable means of stabilization may be utilized.

What I claim is:

1. In the method of manufacturing pneumatic tires from artificial silk using a casein-latex type adhesive to bond the artificial silk to the rubber, the steps which comprise treating the artificial silk with an emulsion of water and a low-boiling volatile oil and then applying the adhesive while the artificial silk is still wet.

2. In the method of manufacturing pneumatic tires from artificial silk using a casein-latex type adhesive to bond the artificial silk to the rubber, the steps which comprise treating the artificial silk with a stabilized emulsion of water and gasoline and then applying the adhesive while the artificial silk is still wet.

3. In the method of manufacturing pneumatic tires from artificial silk using a casein-latex type adhesive to bond the artificial silk to the rubber, the steps which comprise treating the artificial silk with an emulsion of water and gasoline stabilized with ammonium oleate and gelatin and then applying the adhesive while the artificial silk is still wet.

THEODORE A. RIEHL.